United States Patent
Nabicht et al.

(10) Patent No.: US 6,621,346 B1
(45) Date of Patent: Sep. 16, 2003

(54) IMPEDANCE MATCHING FOR PROGRAMMABLE GAIN AMPLIFIERS

(75) Inventors: Joseph T. Nabicht, Rockwall, TX (US); Kazi I. Islam, Dallas, TX (US); Donald C. Richardson, Plano, TX (US); Subahashish Mukherjee, Banglalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/314,764

(22) Filed: May 19, 1999

Related U.S. Application Data

(63) Continuation-in-part of application No. 09/050,620, filed on Mar. 30, 1998, and a continuation-in-part of application No. 09/050,738, filed on Mar. 30, 1998.

(51) Int. Cl.[7] .................................................. H03G 3/10
(52) U.S. Cl. ......................... 330/284; 330/282; 375/222
(58) Field of Search ........................... 330/144, 54, 82, 330/84; 375/222; 327/270, 308, 393

(56) References Cited

U.S. PATENT DOCUMENTS

| | | | |
|---|---|---|---|
| 5,285,169 A | * | 2/1994 | Theus ........................ 330/254 |
| 5,523,721 A | * | 6/1996 | Segawa et al. ................ 330/86 |
| 6,147,558 A | * | 11/2000 | Sculley ........................ 330/284 |
| 6,396,934 B1 | * | 5/2002 | Federspiel ................... 381/100 |

* cited by examiner

Primary Examiner—Henry Choe
(74) Attorney, Agent, or Firm—April M. Mosby; Wade James Brady, III; Frederick J. Telecky, Jr.

(57) ABSTRACT

Digital subscriber modems (8, 15) for use in Asynchronous Digital Subscriber Line (ADSL) communications are disclosed. The central office modem (8) includes a digital transceiver function (10) and an analog front end function (12), where the analog front end function (12) is integrated into a single integrated circuit. According to the disclosed embodiments, the analog front end function (12) includes a transmit and a receive side. On the receive side, an impedance matching circuit (56) is coupled to the input of a programmable gain amplifier (54C). The impedance matching circuit (56) is controlled by the same control signals (C1, C2, C3) as used to select the gain of the programmable gain amplifier (54C), so that a constant input impedance is presented to the signal input (RXP), independent of the selected gain.

5 Claims, 2 Drawing Sheets

IMPEDANCE MATCHING FOR PROGRAMMABLE GAIN AMPLIFIERS

CROSS-REFERENCE TO RELATED APPLICATIONS

This application is a continuation-in-part of application Ser. No. 09/050,620, filed Mar. 30, 1998, and of application Ser. No. 09/050,738, filed Mar. 30, 1998, both commonly assigned herewith and incorporated hereinto by reference.

STATEMENT REGARDING FEDERALLY SPONSORED RESEARCH OR DEVELOPMENT

Not applicable.

BACKGROUND OF THE INVENTION

This invention is in the field of amplifier circuits, and is more specifically directed to programmable gain amplifiers.

Programmable gain amplifiers, particularly those utilizing operational amplifiers, are well known in the art for providing amplification of analog electrical signals. Those of ordinary skill in the art will recognize that programmable gain amplifiers are particularly useful in the amplification of input signals that may be received over a wide dynamic range; the programmability of the gain of the amplifier permits adjustment of the amplifier operating characteristics according to the amplitude of the input signals being received thereby over time. Additionally, many communications systems are operable according to multiple standards or protocols, such that the specified range and characteristics of the input signals may vary widely among the standards; in such systems, it is useful to have a programmable gain amplifier for receiving and amplifying the input signals, such that the gain of the amplifier may be programmably adjusted according to the desired standard. Also, in many applications such as in the field of analog data communications, programmable gain amplifiers are often used in applying a relatively fine adjustment to incoming signals, prior to such processes as analog-to-digital conversion.

Referring now to FIG. 1, conventional programmable gain amplifier 2 will now be described. In this conventional arrangement, programmable gain amplifier 2 includes operational amplifier 20, which has a non-inverting input connected to ground, and an inverting input that receives an input signal from terminal IN via capacitor 18 and input series resistor $R_{IN}$. In this conventional arrangement, the output of operational amplifier 20 is presented on terminal OUT, and is also fed back, as negative feedback, to the inverting input via series resistors RA, RB, RC.

According to this conventional arrangement, the programmability of amplifier 2 is effected by metal-oxide-semiconductor (MOS) transistors 22, 24. MOS transistor 22 has its source-drain path connected across resistor RA, while MOS transistor 24 has its source-drain path connected across both of resistors RA, RB; the gates of transistors 22, 24 are controlled by signals at terminals G1, G2, respectively. In this example, a high logic level at terminal G1 (and a low logic level at terminal G2) will cause resistor RA to be shorted out by transistor 22; similarly, a high logic level at terminal G2 will cause both of resistors RA, RB to be shorted out by transistor 24. As is fundamental in the art, the inverting gain of an operational amplifier is proportional to the ratio between the feedback resistance and the input resistance. Accordingly, the feedback resistance of programmable amplifier 2, and thus its gain, is determined by the state of signals G1, G2; in this example, amplifier 2 may have any one of the resistances of RA+RB+RC, RB+RC, or RC as its feedback resistance, depending upon the state of control terminals G1, G2.

It has been observed, according to the present invention, that significant distortion can be produced by amplifier 2 according to this conventional arrangement of FIG. 1. It is contemplated that this distortion is because switching transistors 22, 24, when on, conduct the signal current itself. As illustrated in FIG. 1, when either one of transistors 22 or 24 is turned on, current is conducted therethrough between the input and output terminals IN, OUT, depending upon the signal levels at each (considering that the inverting input of operational amplifier 20 typically has an extremely high input impedance). Because the source-drain resistance of an MOS transistor depends upon the current conducted therethrough, the feedback resistance presented by the ones of series resistors RB, RC not shorted out plus the source-drain resistance of the shorting transistor 22, 24 will vary with signal current. Particularly in high precision applications such as high frequency modems, this distortion in programmable gain amplifiers such as amplifier 2 may not be tolerable.

FIG. 2 illustrates another conventional programmable gain amplifier 25, in which the distortion due to signal current being conducted by the shorting transistors of the example of FIG. 1 is avoided. In this example, input line IN is capacitively coupled to an integrated circuit containing programmable gain amplifier 25 via external high-pass coupling capacitor 18 connected to bond pad BP of the integrated circuit (boundary B of FIG. 2 illustrating the chip boundary of the integrated circuit). Programmable gain amplifier 25 has its gain programmably set through operation of switches S12, S23, S3X, which are connected between the inverting input of operational amplifier 30 and nodes between resistors R1, R2, R3, RX, which are connected in series between the output of amplifier 30 and external coupling capacitor 18. The values of resistors R1, R2, R3, RX will typically vary among themselves, depending upon the range and resolution of programmable gain levels desired for amplifier 25. The non-inverting input of amplifier 30 is biased to ground, and the output of amplifier 30 is presented at terminal OUT.

Similarly as in the case described above relative to FIG. 1, switches S12, S23, S3X are generally implemented by way of MOS transistors, with a control signal connected to the gate of each that sets the state of each switch S12, S23, S3X. The state of switches S12, S23, S3X determine the gain of programmable gain amplifier 25, by setting the ratio between feedback and input resistance as seen by amplifier 30. As noted above, the gain of amplifier 25 is proportional to the ratio between its feedback resistance and its input resistance. For example, if switch S23 is closed and all other switches S12, S3X are open, the gain of programmable gain amplifier 25 will be proportional to $$\frac{RX + R3}{R1 + R2}.$$

Other combinations of switches S12, S23, S3X will select different ratios of feedback to input resistance and thus implement a different gain.

Programmable gain amplifier 25 of FIG 2 avoids one type of distortion, namely that caused by the switching transistors conducting signal current as in the case described above relative to FIG. 1. This is because one may safely consider the inverting input of operational amplifier 30 as having extremely high impedance. The high input impedance of operational amplifier 30 limits the current that must be conducted by any one of switches S12, S23, S3X, implemented as MOS transistors, as switches S12, S23, S3X are connected between the inverting input of operational amplifier 30 and a node along the resistor chain of the input and feedback resistors. As such, signal current is never conducted by switches S12, S23, S3X, and thus no current-dependent changes are presented thereby. As such, the low frequency behavior of programmable gain amplifier 25 is of quite high fidelity.

However, changes in the gain of programmable gain amplifier 25 will also change its high frequency response. Specifically, the high-pass filter established by external capacitor 18 of capacitance $C1_8$ will have a pole determined by $$\frac{1}{R_{in}C_{18}},$$

where $R_{in}$ is the input resistance. These changes in high frequency response will thus modulate the frequency response of the overall circuit from the ideal, causing distortion in the amplified signal at terminal OUT. As discussed above, especially in high precision communications applications such as high data rate modems, distortion due to programmable gain amplifiers is quite undesirable. Indeed, this conventional programmable gain amplifier 25 of FIG. 2 requires adjustment in the input signal level presented thereto according to the selected gain in order to avoid this high frequency distortion.

BRIEF SUMMARY OF THE INVENTION

It is therefore an object of the present invention to provide a programmable gain amplifier having reduced high frequency distortion.

It is a further object of the present invention to provide such a programmable gain amplifier in which the input impedance presented thereby is constant over variations in the gain of the amplifier.

It is a further object of the present invention to provide such a programmable gain amplifier in which the input signal level need not be adjusted according to the programmed gain.

It is a further object of the present invention to provide such a programmable gain amplifier that may be efficiently implemented into an integrated circuit.

It is a further object of the present invention to provide such a programmable gain amplifier that may be efficiently implemented into analog front end functionality in a DSL modem system.

Other objects and advantages of the present invention will be apparent to those of ordinary skill in the art having reference to the following specification together with its drawings.

The present invention may be implemented into a programmable gain amplifier, such as may be implemented into an analog front end integrated circuit for digital subscriber line (DSL) modems. According to the present invention, the programmable gain amplifier includes a series of resistors connected between the output of an operational amplifier and an input terminal, with switches in a first set provided to selectably connect one of several taps along the resistor series to an amplifier input. Additionally, a series of resistors is connected between the amplifier input and ground, with switches connected to taps along this series, to short out one or more of the resistors in the series in a manner corresponding to the gain selected by the first set of switches. As a result, a parallel matching resistance is varied with the selected gain of the programmable gain amplifier, stabilizing the high frequency operation of the circuit.

DETAILED DESCRIPTION OF THE INVENTION

As will become apparent from the following description, the programmable gain amplifier according to the preferred embodiment of the invention may be used in any system or other application within which conventional programmable gain amplifiers are useful; it is contemplated that the benefits of the present invention, particularly in stability of high frequency response of such amplifiers, will be obtained in any such application or utilization. However, as it is contemplated that the present invention is especially beneficial in the high-frequency, high precision, application of a high data rate modem, an exemplary implementation of the present invention in such a modem will be provided herein. It is contemplated that those of ordinary skill in the art having reference to this specification will be readily able to implement the present invention into any and all appropriate applications and uses.

Figure 3:
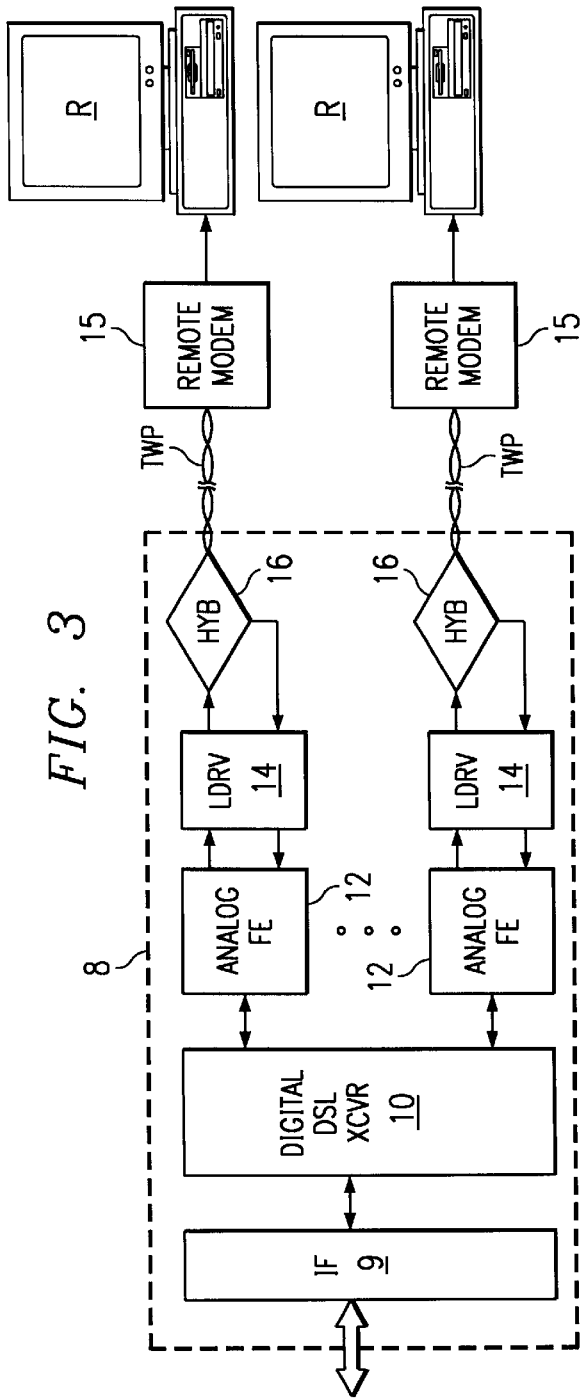
FIG. 3 is an electrical diagram, in block form, of a digital subscriber line (DSL) modem system, including a DSL modem at the a central office in the telephone system, constructed according to the preferred embodiment of the invention.

Referring now to FIG. 3, a telecommunications system into which the present invention may be realized will now be described. The system of FIG. 3 illustrates a contemplated digital subscriber line (DSL) application of the present invention, and specifically one in which asymmetric DSL (ADSL) technology is used. It is of course contemplated that the present invention may also be beneficial in other system applications. However, given the stringent requirements presented by modern DSL standards, particularly in filter performance and bit rate, it is contemplated that the present invention is particularly well-suited for use in connection with DSL technology.

FIG. 3 illustrates a typical system installation of DSL services, in which multiple remote subscribers interface with a telephone system central office. In this example, a user in a home or office environment operates remote computer system R, such as a personal computer or workstation, or alternatively an entertainment unit in the video-on-demand (VOD) context. Each of remote computer systems R serves as a remote source and destination of communicated data, which may be representative of text, graphics, motion pictures, audio, etc. Each remote system R is associated with a remote DSL modem 15, by way of which the remote system R communicates with central office DSM modem 8 over a conventional twisted-pair telephone facility TWP. One or more telephones (not shown) may also be connected into each twisted pair wire facility TWP, such that POTS voice communications may alternatively or additionally be communicated over twisted pair wire facility TWP.

As illustrated in FIG. 3, each of twisted pair wire facilities TWP is received by central office DSL modem 8, which is contemplated to be located in a central office of the local or long distance telephone service provider. Central office modem 8, in this example, is capable of receiving multiple twisted pair wire facilities TWP (only two of which are illustrated in this example). Central office modem 8 provides communication of data between twisted pair wire facilities TWP, and thus remote systems R, and a host computer (not shown in FIG. 3) which serves as the source of destination of data, or as an intermediate gateway to a network, such as the Internet, or a dedicated "dial-up" content provider or network. Of course, the central office will typically also include switchgear for the routing of calls such as those placed by remote systems R (or associated telephones) over twisted pair wire facilities TWP. As noted above, central office modem 8 will likely be connected to a backbone network, which in turn is in communication with other communication paths by way of equipment such as routers or Digital Subscriber Line Access Multiplexers (DSLAMs). In the application where POTS service overlays the ADSL data traffic, such equipment may also include some type of "splitter" for separating POTS from the data traffic, routing the POTS traffic to the conventional telephone network (PSTN) and routing the data to a wide-area network (WAN).

In the specific example of FIG. 3, the DSL technology is of the asymmetric type (i.e., ADSL), with traffic traveling from central office modem 8 to remote modems 15 (i.e., downstream) at a signal bandwidth of 25 kHz to 1104 kHz, and traffic traveling from remote modems 15 to central office modems 8 (i.e., upstream) at a signal bandwidth of 25 kHz to 138 kHz. Of course, the present invention may be implemented to benefit in other ADSL and DSL arrangements, with the appropriate adjustment to the particulars of the filters and other functions, as will become apparent to those of ordinary skill in the art having reference to this specification.

Figure 1:
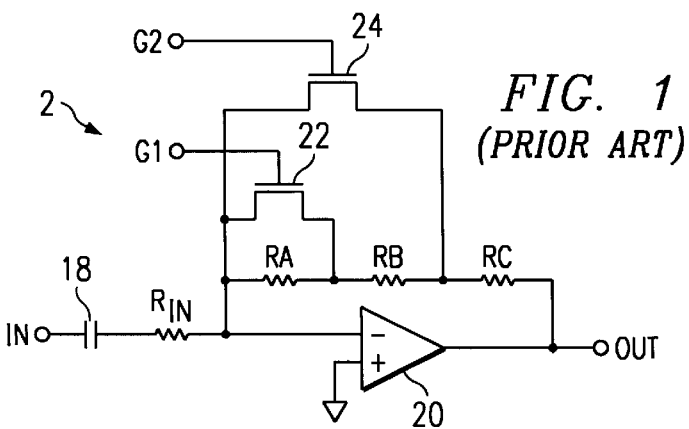
FIGS. 1 and 2 are electrical diagrams, in schematic form, of conventional programmable gain amplifiers.

In the central office, central office DSL modem 8 includes host interface 9 which connects modem 8 to a host computer (not shown). Host interface 9 may, as noted above, be implemented by conventional circuitry such as the TNETD2100 digital series bus interface circuit available from Texas Instruments Incorporated. As noted above, the host computer will interface central office modem 8 to a splitter for separating POTS from the data traffic, as noted above, and thus to the conventional telephone network (PSTN) and wide-area network (WAN) as appropriate for the service being provided. Central office modem 8 includes digital DSL transceiver function 10, which connects to multiple analog front end functions (AFEs) 12 as shown in FIG. 1.

Digital transceiver function 10 in central office modem 8 performs the appropriate and necessary processing upon digital signals as will be transmitted by, or as received by, central office modem 8. It is contemplated that digital transceiver function 10 is preferably implemented as a high-performance digital signal processor, such as the TMS320C6x, available from Texas Instruments Incorporated. Since both transmitted and received signals are to be processed by digital transceiver function 10, one may consider its architecture as having a transmit side and a receive side.

In summary, on its transmit side, signals received by digital transceiver function 10 from PC interface 9 are encoded into frames, and then modulated into DMT subcarriers, with scaling and clipping control applied as desired. An inverse Fast Fourier Transform (IFFT) transforms the encoded data into time-domain signals corresponding to the encoded subcarriers, with a circular prefix added to interframe portions of the sequence. Each channel of encoded time-domain digital data, with circular prefix, is then applied to an associated analog front end (AFE) 12 in the form of a bitstream. On its receive side, digital transceiver function 10 receives a digital data bitstream from AFE 12. Automatic gain control is applied, followed by time domain equalizing (TEQ) to eliminate intersymbol interference (ISI). The circular prefixes are then removed from the bitstream, prior to application of a Fast Fourier Transform (FFT) to transform the time domain signal into digital frequency domain representations. Frequency domain equalization and phase compensation flatten the signal spectrum of the received sequence, and compensate for phase distortion. Finally, decoding and deframing in combination with bit demapping and gain scaling, tone reordering and packing processes, are performed to generate a digital word that is applied to the host system via PC interface 9.

Attention is directed to copending applications Ser. No. 09/050,620 and Ser. No. 09/050,738, both filed Mar. 30, 1998, both commonly assigned herewith, and both incorporated hereinto by reference, for a more detailed description of the signal flow through and digital functions performed by digital transceiver function 10.

Remote modems 15 are somewhat similarly constructed as and performs similar processing to central office modem 8, with certain differences in function arising from the different frequencies of its received and transmitted traffic as noted below. In this regard, remote modems 15 will include a digital transceiver function, implemented for example as a high-performance digital signal processor, such as the TMS320C6x, availabe from Texas Instruments Incorporated. Attention is directed to copending applications Ser. No. 09/050,620 and Ser. No. 09/050,738, both filed Mar. 30, 1998, both commonly assigned herewith, and both incorporated hereinto by reference, for detailed description of the signal flow through and digital functions performed by remote modems 15.

Referring back to FIG. 3, central office modem 8 also includes multiple AFEs 12, preferably arranged in master/slave fashion among one another, each of which is in communication with one of twisted-pair facilities TWP, and thus with one of remote DSL modes 15 in a DSL session, as shown. Each of AFEs 12 in central office modem 8 is in communication with an associated line driver 14. Each of line drivers 14 is bidirectionally coupled to an associated four-wire to two-wire hybrid 16, for interfacing the modem to an associated twisted pair facility TWP.

According to the preferred embodiment of the invention, as noted above, AFEs 12 are realized by integrated circuits which execute all analog loop interface functions that are not exposed to high voltages, and in a manner which eliminates the need for complex analog filtering (which is not suitable for integration due to the need for extensive component trimming), but still meets the requirements of the operative specifications.

Figure 4:
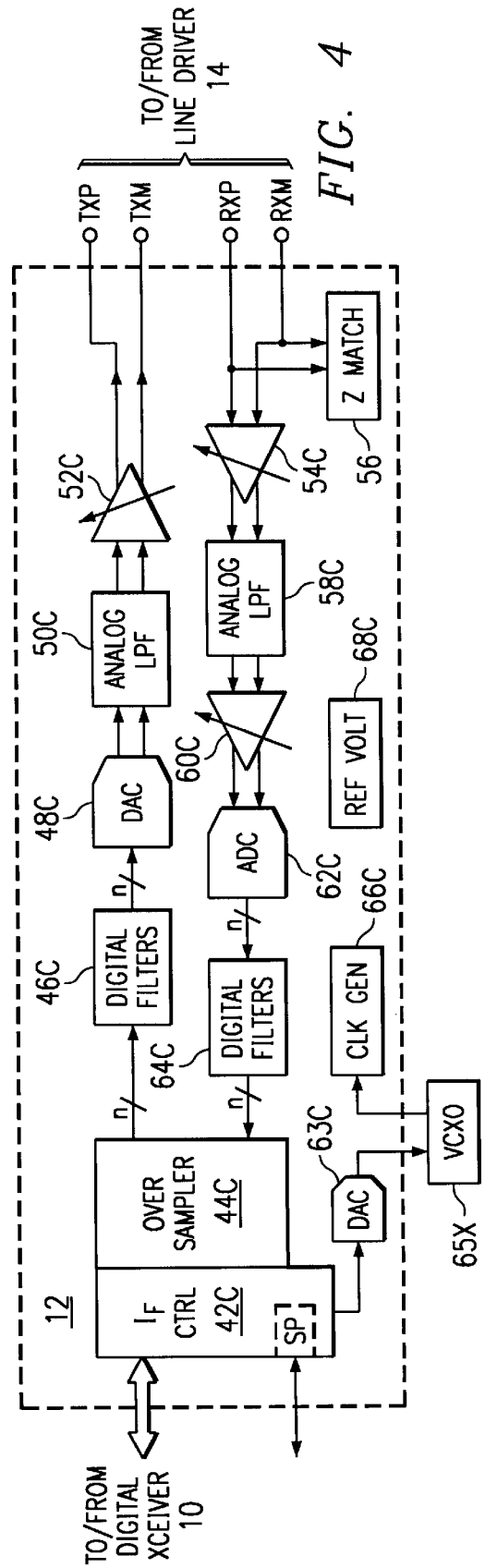
FIG. 4 is an electrical diagram, in block form, of the analog front end function in the central office DSL modem of the system of FIG. 3 according to the preferred embodiment of the invention.

Referring now to FIG. 4, the construction of AFE 12 in central office DSL modem 8, within which the preferred embodiment of the invention is implemented, will now be described in detail. As mentioned above, this construction enables AFE 12 to be integrated into a single integrated circuit, providing important advantages such as reduced cost, improved system reliability, and component matching. The integrated circuit of AFE 12 will be of the so-called "mixed-signal" type considering that both digital and analog processes are carried out thereby. Additional integration scale may, of course, be alternatively obtained by the integration of AFE 12 as described herein with either or both of digital transceiver function 10 or line driver 14, as appropriate for the available manufacturing technology.

AFE 12 includes a transmit side and a receive side, given its bidirectional nature. In this embodiment of the invention, the transmit and receive sides share interface and control function 42C, by way of which AFE 12 communicates with digital transceiver 10. Interface and control function 42C includes a parallel digital interface, by way of which digital words to be transmitted by central office modem 8 are received by AFE 12, and by way of which data received from twisted pair facility TWP and processed by AFE 12 are communicated as digital words to digital transceiver 10. According to the preferred embodiment of the invention, this parallel interface is a sixteen-bit parallel interface, with edge-triggered read and write strobe inputs for controlling the reading of data therefrom and writing of data thereto, respectively. Additionally, interface and control function 42C includes multiple control registers for storing control words that set the state of various functions in AFE 12, such as gain values for the various programmable amplifiers, switch control for the bypass or enable of various filter blocks and functions, and in the case of AFE 12, for an input impedance matching function at the receiver end (described in further detail hereinbelow).

Interface and control function 42C also includes the appropriate signal interface for receiving and providing control information from and to digital transceiver 10. In this embodiment of the invention, serial port SP is provided to receive control information such as used to set the frequency of clock signals, as will be noted below. Conventional scan testing, such as according to the JTAG standard, is also preferably implemented via interface and control function 42C.

Clock circuitry 66C is shared by the transmit and receive sides of AFE 12, and provides the corresponding clock control for synchronous operation thereof. According to the preferred embodiment of the present invention clock circuitry 66C generates internal (and, if desired, external) clock signals based upon an external voltage controlled crystal oscillator (VCXO) 65X. In AFE 12, digital-to-analog converter (DAC) 63C is provided which, in response to control signals generated by interface and control function 42C (specifically via update signals applied to serial port SP therein), produces an analog voltage that is applied to, and thus controls, voltage controlled crystal oscillator 65X. DAC 63C, in a preferred implementation, is a 12-bit serial DAC, which provides suitable fine resolution for high-frequency (e.g., 35.328 MHz) VCXO 65X.

Voltage reference 68C, preferably a stable voltage reference circuit such as a bandgap reference, is also shared by the transmit and receive sides of AFE 12, and may be realized by conventional circuitry for establishing the necessary reference voltage levels for use in digital-analog conversion and analog-digital conversion operations, as well as in other components of AFE 12. Other circuitry used in the operation of AFE 12, including standard integrated circuit functions such as power supply distribution and regulation, general purpose port communications, and the like, may of course also be included therein, but is not shown for purposes of clarity of this description. AFE 12 also includes oversampling register 44C as shown in FIG. 4, which comprises one or more register stages, as may be used in both the transmit and receive sides of AFE 12 in realizing the desired digital filter operations.

Referring briefly to the transmit side of AFE 12, digital filters 46C receive digital data words from oversampling registers 44C, and implement digital filter operations upon these digital data words, prior to digital-to-analog conversion. The desired digital filter sequence may vary from application to application, but it is contemplated that a series of digital filter operations will be realized by digital filters 46C. Attention is directed to the above-incorporated copending applications Ser. No. 09/050,620 and Ser. No. 09/050,738 for detailed description of a preferred sequence of digital filters 46C.

Referring back to FIG. 4, the filtered digital data is now applied to digital-to-analog converter (DAC) 48C which, according to the preferred embodiment of the present invention, is a 14-bit current steering architecture DAC which operates at 4X oversampling, as described in detail in the above-incorporated copending applications Ser. No. 09/050,620 and Ser. No. 09/050,738. The analog output of DAC 48C is applied to analog low-pass filter 50C. Analog low-pass filter 50C, according to the preferred embodiment of the present invention, is a third-order Chebyshev continuous-time filter, implemented according to conventional techniques, with a ripple preferably less than ±0.5 dB at the nominal 1.325 MHz passband. This relatively simple analog filter is enabled by the extent of the digital filtering previously provided by filters 46C. The output of analog low pass filter 50C is presented by programmable attenuator 50C, which is constructed according to conventional techniques. The output of programmable attenuator 50C is presented on lines TXP, TXM to line driver 14, and corresponds to an analog signal corresponding to the data to be transmitted, encoded in the manner implemented by digital transceiver 10, and with the frequency characteristics specified by the applicable DSL standard, such as T1E1.413.

Referring now to the receive side of AFE 12, line RXP, RXM are received from line driver 14 by programmable gain amplifier 54C. Programmable gain amplifier 54C preferably amplifies the incoming signal according to one of several finely-adjustable levels, for example from 0 dB to 3 dB in 1 dB steps, selectable by way of a control word. According to the preferred embodiment of the present invention, the input impedance of programmable gain amplifier 54C is adjusted by impedance matching circuit 56 to present a constant input impedance to line driver 14 at lines RXP, RXM, regardless of the selected gain of amplifier 54C, as will now be described relative to FIG. 5.

Figure 2:
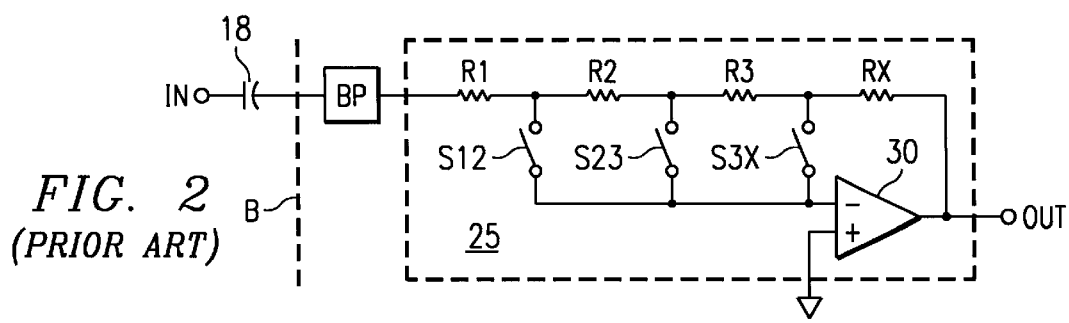
Figure 5:
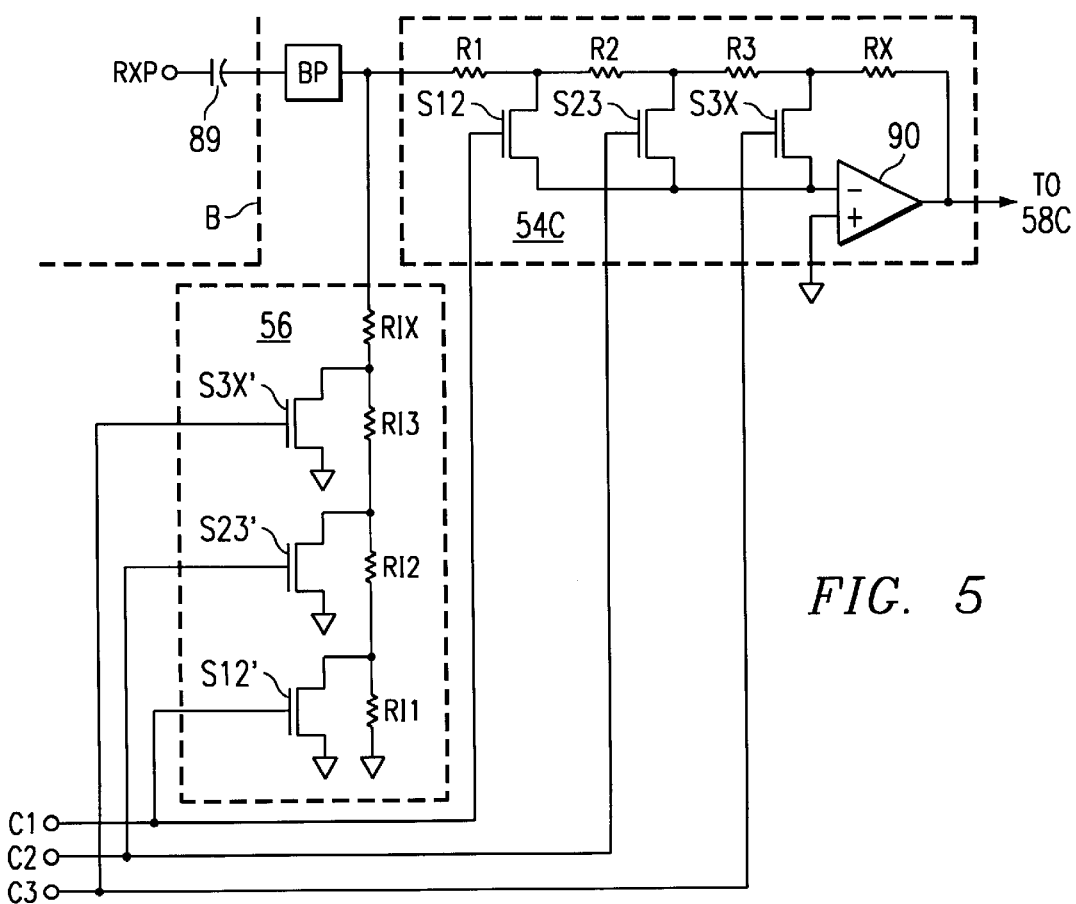
FIG. 5 is an electrical diagram, in schematic form, of a programmable gain amplifier in combination with an impedance matching circuit according to the preferred embodiment of the invention.

Referring now to FIG. 5, the implementation of programmable gain amplifier 54C in combination with impedance matching circuit 56, according to the preferred embodiment of the present invention, will now be described in detail. The construction and operation of programmable gain amplifier 54C remains as described above relative to programmable gain amplifier 25 of FIG. 2, in which MOS transistor switches S12, S23, S3X control the selection of the gain of amplifier 54C, in such a manner in which signal current is not be conducted thereby. Specifically, as shown in FIG. 5, switches S12, S23, S3X each have a source-drain path connected between the inverting input of operational amplifier 30 and a corresponding node between resistors R1 and R2, R2 and R3, and R3 and RX, respectively. Resistors R1, R2, R3, RX are connected in series between the output of amplifier 90 and external coupling capacitor 89. Amplifier 90 is a conventional operational amplifier, as described above relative to FIG. 2, which has its non-inverting input biased to ground as shown. Alternatively, amplifier 90 may be implemented as a differential amplifier, particularly where two lines are used to communicate analog signals (it being contemplated that those of ordinary skill in the art will be readily able to implement differential versions of the amplifier circuits which are described herein relative to single-ended inputs). Bond pad BP and chip boundary B, as before, illustrate the boundary of the integrated circuit into which programmable gain amplifier 54C (and impedance matching circuit 56) are implemented, namely AFE 12.

In the preferred embodiment of the invention as illustrated in FIG. 5, impedance matching circuit 56 is connected to external coupling capacitor 89, between bond pad BP and first input resistor R1 at the input of programmable gain amplifier 56C. Impedance matching circuit 56, in this embodiment of the invention, includes multiple resistors RIX, RI3, RI2, and RI1 connected in series between the input to programmable gain amplifier 56C and ground. According to the preferred embodiment of the invention, switches S3X', S23', S12' are preferably constructed as MOS transistors, each of which have a source-drain path connected on one end to ground and on another end to an intermediate node between resistors RIX and RI3, RI3 and RI2, and RI2 and RI1, respectively. With this connection, each of MOS transistor switches S3X', S23', S12', when closed, shorts out one or more of resistors RI3, RI2, RI1 in impedance matching circuit 56.

According to this preferred embodiment of the invention, the gates of MOS transistors switches S3X', S23', S12' are controlled by the same control signals as used to control switches S3X, S23, S12, respectively. In this example, control signal C1 controls both of switches S12 and S12', control signal C2 control both of switches S23 and S23', and control signal C3 control both of switches S3X and S3X', such that the active one of control signals C1, C2, C3 closes both one switch in programmable gain amplifier 54C and also a corresponding switch in impedance matching circuit 56. For example, when swtich S23 is closed and switches S3X, S12 are open (i.e., control signal C2 is active and control signals C1, C3 are inactive), switch S23' will be closed and switches S3X', S12' will all be open. In the implementation of programmable gain amplifier 54C and impedance matching circuit 56 within AFE 12 of FIG. 4, the state of control signals C1, C2, C3 may be set by control registers within interface and control function 42C, as described above.

The values of resistors RIX, RI3, RI2, RI1 are selected to correspond to the values of resistors R1, R2, R3, RX in such a manner as to maintain the input resistance presented at bond pad BP substantially constant over the available gain values. This is because the frequency response of the combination of programmable gain amplifier 54C and impedance matching circuit 56 will be proportional to:

$$\frac{1}{(R_{in}\|R_{56})C_{89}}$$

where $R_{56}$ corresponds to the resistance through impedance matching circuit 56 for a given selection of switches S3X', S23', S12'.

In the arrangement of FIG. 5, the input resistance presented at bond pad BP will be equal to the sum of the resistors R1, R2, R3 selected as input resistors to amplifier 90, in parallel with the corresponding ones of resistors RIX, RI3, RI2, RI1 that are in the series connection between bond pad BP and ground through impedance matching circuit 56. For example, if switches S23 and S23' are closed, will all other switches in programmable gain amplifier 54C and impedance matching circuit 56 open, the input resistance presented by programmable gain amplifier 54C will correspond to resistors R1, R2 in parallel with resistors RIX, RI3, or $$\frac{(R1+R2)(RIX+RI3)}{(R1+R2)+(RIX+RI3)}$$

Similarly, if switches S12 and S12' are closed, with all other switches open (which is a higher gain selection than when switches S23, S23' are closed), the input resistance presented by the combination of programmable gain amplifier 54C and impedance matching circuit 56 will correspond to:

$$\frac{(R1)(RI2+RI3+RIX)}{R1+(RI2+RI3+RIX)}$$

One can readily set the values of resistors R1, R2, R3, RX, and resistors RIX, RI3, RI2, RI1 in such a manner as to minimize the variation of input resistance over the available universe of selection for switches S3X', S23', S12'. For example, the following values of resistance for resistors R1, R2, R3, RX, and resistors RIX, RI3, RI2, RI1 will provide a relatively constant input impedance:

| R1 | R2 | R3 | RX | RI1 | RI2 | RI3 | RIX |
|---|---|---|---|---|---|---|---|
| 12965 Ω | 1550 Ω | 1732 Ω | 1960 Ω | 532 Ω | 425 Ω | 350 Ω | 6900 Ω |

For these values of resistors R1, R2, R3, RX, and resistors RIX, RI3, RI2, RI1, one may readily derive the parallel resistance of programmable gain amplifier 54C and impedance matching circuit 56 for each of the switch combinations as follows:

| Switches closed | $R_{in}$ | $R_{56}$ | $R_{in}\|R_{56}$ |
|---|---|---|---|
| S12;S12' | 12965 Ω | 7675 Ω | 4821.05 Ω |
| S23;S23' | 14515 Ω | 7250 Ω | 4835.00 Ω |
| S3X;S3X' | 16247 Ω | 6900 Ω | 4843.15 Ω |

As is evident from the above table, the resulting parallel input resistance $R_{in}\|R_{56}$ remains quite constant over the three selected gains in the example of FIG. 5 according to this preferred embodiment of the invention. It is of course contemplated that those of ordinary skill in the art will be readily able to similarly realize programmable gain amplifier 54C in combination with impedance matching circuit 56 with different resistance values, according to particular realizations.

Because of the implementation of impedance matching circuit 56, the gain of programmable gain amplifier 54C can be programmably selected based upon the particular characteristics of the subscriber loop currently in communication with central office modem 8 within which AFE 12 according to the preferred embodiment of the invention is realized, without significantly altering the input impedance presented by AFE 12 to line driver 14 and the remainder of the system. Accordingly, the response of AFE 12 to received signals is greatly improved by the implementation of impedance matching circuit 56.

Referring back to FIG. 4, the output of programmable gain amplifier 54C is presented to analog low pass filter 58C, followed by amplification by programmable gain amplifier 60C and analog-to-digital conversion by analog-to-digital converter (ADC) 62C. The output of ADC 62C is then applied to digital filters 64C, and then optionally presented to oversampled registers 44C for interpolation filtering if desired and then to interface and control function 42C for communication to digital transceiver function 10 described hereinabove. The detailed construction and operation of AFE 12 from analog low pass filter 58C through digital filters 64C is provided in above-incorporated copending applications Ser. No. 09/050,620 and Ser. No. 09/050,738.

As described hereinabove, the present invention provides important advantages in providing programmable gain amplifier capability. Firstly, the present invention permits the use of MOS transistor switches to set the gain of the programmable gain amplifier, in such a manner that does not involve non-linearity due to signal current being conducted by the MOS transistor switches. This important advantage is obtained, in connection with the present invention, in combination with an input impedance matching circuit that maintains the input impedance of the programmable gain amplifier constant, over the range of selectable gains. This matching of input impedance to the programmable gain of the amplifier maintains a constant high frequency response of the amplifier over a wide range of gain characteristics. The input levels or drive of the input signals presented to the programmable gain amplifier need not be modified when changing the gain level of the amplifier, thus simplifying system implementation and use, especially in high fidelity, high frequency systems as digital subscriber line modems.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A modem, comprising:
    a host interface;
    a digital transceiver function coupled to the host interface;
    a line driver, for driving and receiving analog signals over a telephone facility; and
    an analog front end circuit, comprising:
        a digital interface, for communication of digital signals to the digital transceiver function;
        an analog-to-digital converter, having an output coupled to the digital interface, and having an input; and
        a programmable gain amplifier, having a signal input coupled to the line driver, having an output coupled to the analog-to-digital converter, and comprising:
            an operational amplifier having an input and an output;
            a plurality of input resistors, connected in series between the signal input and the input of the operational amplifier;
            a plurality of gain switches, each having a conduction path connected between an associated pair of the plurality of input resistors and the input of the operational amplifier;
            a plurality of matching resistors, connected in series between the signal input and a reference voltage; and
            a plurality of matching switches, each having a conduction path connected between an associated pair of the plurality of matching resistors and the reference voltage, and each of the plurality of matching switches associated with one of the plurality of gain switches so that the state of each of the plurality of matching switches corresponds to the state of its associated one of the plurality of gain switches.

2. The modem of claim 1, wherein each of the plurality of gain switches has a control electrode for receiving a control signal;
    wherein each of the plurality of matching switches has a control electrode for receiving a control signal,
    and wherein the control electrode for each of the plurality of matching switches is connected in common with the control electrode of its associated one of the plurality of gain switches.

3. The modem of claim 2, wherein the analog front end further comprises:
    control circuitry for generating the control signals.

4. The modem of claim 2, wherein each of the plurality of gain switches comprises a MOS transistor
    and wherein each of the plurality of matching switches comprises a MOS transistor.

5. The modem of claim 1, wherein a first one of the plurality of gain switches has its conduction path connected between first and second ones of the plurality of input resistors, the first one of the plurality of input resistors being connected nearer the signal input than the second one of the plurality of input resistors;
    wherein a second one of the plurality of gain switches has its conduction path connected between second and third ones of the plurality of input resistors, the second one of the plurality of input resistors being connected nearer the signal input than the third one of the plurality of input resistors;
    wherein a first one of the plurality of matching switches is associated with the first one of the plurality of gain switches, and has its conduction path connected between first and second ones of the plurality of matching resistors, the first one of the plurality of matching resistors being connected nearer the reference voltage than the second one of the plurality of matching resistors;
    and wherein a second one of the plurality of matching switches is associated with the second one of the plurality of gain switches, and has its conduction path connected between second and third ones of the plurality of matching resistors, the second one of the plurality of matching resistors being connected nearer the reference voltage than the third one of the plurality of matching resistors.

* * * * *